(12) United States Patent  
Pinto

(10) Patent No.: US 6,679,280 B1  
(45) Date of Patent: Jan. 20, 2004

(54) MANIFOLD FOR FUEL CELL SYSTEM

(75) Inventor: Martín De Tezanos Pinto, Carlsbad, CA (US)

(73) Assignee: Metallic Power, Inc., Carlsbad, CA (US)

( * ) Notice: Subject to any disclaimer, the term of this patent is extended or adjusted under 35 U.S.C. 154(b) by 277 days.

(21) Appl. No.: 10/072,856

(22) Filed: Oct. 19, 2001

(51) Int. Cl.$^7$ .............................. F17D 1/18; H01M 2/14
(52) U.S. Cl. ....................... 137/14; 137/561 A; 429/39
(58) Field of Search ............................... 137/561 A, 14; 429/39

(56) References Cited

U.S. PATENT DOCUMENTS

| | | | |
|---|---|---|---|
| 2,723,680 A | * 11/1955 | Danel ...................... | 137/561 A |
| 3,440,098 A | 4/1969 | Stachurski ...................... | 136/6 |
| 3,451,851 A | 6/1969 | Stanimirovitch ............. | 136/30 |
| 3,589,941 A | * 6/1971 | Eaton et al. ................... | 429/39 |
| 3,639,173 A | 2/1972 | Stachurski ...................... | 136/3 |
| 3,642,689 A | * 2/1972 | Isreeli et al. ............. | 137/561 A |
| 3,660,170 A | 5/1972 | Rampel ...................... | 136/154 |
| 3,663,298 A | 5/1972 | McCoy et al. ................. | 136/31 |
| 3,716,413 A | 2/1973 | Eisner .......................... | 136/86 |
| 3,767,466 A | 10/1973 | McCoy et al. ............... | 136/131 |
| 3,811,952 A | 5/1974 | Siwersson et al. ............ | 136/86 |
| 3,847,671 A | 11/1974 | Leparulo et al. .............. | 136/86 |
| 3,879,225 A | 4/1975 | Backhurst et al. ............ | 136/86 |
| 3,887,400 A | 6/1975 | Doniat et al. ................. | 136/86 |
| 3,902,918 A | 9/1975 | Pompon ...................... | 136/86 |
| 3,930,882 A | 1/1976 | Ohsawa et al. ................ | 136/86 |
| 3,944,430 A | 3/1976 | Lee .............................. | 136/30 |

(List continued on next page.)

FOREIGN PATENT DOCUMENTS

| | | |
|---|---|---|
| EP | 0568822 A2 | 11/1993 |
| EP | 0755088 A2 | 1/1997 |
| FR | 2639767 | 11/1988 |
| FR | 2669775 | 11/1990 |
| JP | 51-494439 | 4/1976 |
| WO | WO 00/38260 | 6/2000 |

OTHER PUBLICATIONS

Appleby, A. J. et al.: *The C.G.E. Circulating Zinc/Air Battery: A Practical Vehicle Power Source*; Journal of Power Sources; 1976/1977; vol. 1; pp. 17–24.

Appleby, A.J. et al.: *Charge–Discharge Behavior of the C.G.E. Circulating Zinc–Air Vehicle Battery*; Society of Automotive Engineers, Cobo Hall, Detroit; Feb. 28–Mar. 4, 1977.

Cooper, J., et al.; et al.; *Demonstration of a Zinc/Air Fuel Battery to Enhance the Range and Mission of Fleet Electric Vehicles: Preliminary Results in the Refueling of a Multicell Module*; 29$^{th}$ Intersociety Energy Conversion Engineering Conference; Aug. 8, 1994; 8 pages.

Cooper, J.; *How the Zinc/Air Battery is Refueling the Competitiveness of Electric Vehicles*; Science & Technology Review ; Oct. 1995; pp. 7–13.

*Primary Examiner*—A. Michael Chambers
(74) *Attorney, Agent, or Firm*—Howrey Simon Arnold & White, LLP

(57) ABSTRACT

A method and apparatus for converting single multiphase fluid flow into plural multiphase fluid flows having substantially uniform composition and flow properties. A manifold comprises an enclosure having an inlet and an inner surface perpendicular to the inlet such that the incident angle of input flow impacts the surface to form a stagnation point whereby an intermediate flow is deflected along the surface substantially symmetrically outward from the stagnation point and channeled to a plurality of parallel fluid outlets connected to the enclosure. The distance between the stagnation point and the plurality of outlets is selected to maintain substantially equivalent fluid pressures and uniform flow rates at the outlets. A preferred embodiment of the manifold channels the intermediate flow between two walls forming a triangular shaped nozzle directing the flow from the stagnation point to the base of the triangle for communication of electrolyte to a metal-based fuel cell through the plurality of outlets.

25 Claims, 2 Drawing Sheets

U.S. PATENT DOCUMENTS

| | | | |
|---|---|---|---|
| 3,970,472 A | 7/1976 | Steffensen | 136/3 |
| 3,981,747 A | 9/1976 | Doniat et al. | 429/15 |
| 3,985,581 A | 10/1976 | Stachurski et al. | 429/51 |
| 4,074,028 A | 2/1978 | Will | 429/105 |
| 4,105,829 A | 8/1978 | Venero | 429/15 |
| 4,127,701 A | 11/1978 | Symons et al. | 429/19 |
| 4,145,482 A | 3/1979 | von Benda | 429/27 |
| 4,147,839 A | 4/1979 | Solomon et al. | 429/15 |
| 4,172,924 A | 10/1979 | Warszawski | 429/15 |
| 4,198,475 A | 4/1980 | Zaromb | 429/15 |
| 4,218,521 A | 8/1980 | Putt et al. | 429/39 |
| 4,272,333 A | 6/1981 | Scott et al. | 204/23 |
| 4,287,273 A | 9/1981 | Harney et al. | 429/153 |
| 4,310,605 A * | 1/1982 | Early et al. | 429/39 |
| 4,352,864 A | 10/1982 | Struthers | 429/18 |
| 4,415,636 A | 11/1983 | Charkey | 429/27 |
| 4,479,856 A | 10/1984 | Ando | 204/55 |
| 4,485,154 A | 11/1984 | Remick et al. | 429/14 |
| 4,563,403 A | 1/1986 | Julian | 429/198 |
| 4,593,653 A * | 6/1986 | Schneider et al. | 122/365 |
| 4,730,153 A | 3/1988 | Breting et al. | 320/14 |
| 4,731,547 A | 3/1988 | Alenduff et al. | 307/85 |
| 4,802,100 A | 1/1989 | Aasen et al. | 364/494 |
| 4,828,939 A | 5/1989 | Turley et al. | 429/38 |
| 4,842,963 A | 6/1989 | Ross, Jr. | 429/21 |
| 4,855,030 A | 8/1989 | Miller | 204/212 |
| 4,950,561 A | 8/1990 | Niksa et al. | 429/27 |
| 5,006,424 A | 4/1991 | Evans et al. | 429/15 |
| 5,101,847 A * | 4/1992 | Oribe | 137/1 |
| 5,156,925 A | 10/1992 | Lapp | 429/19 |
| 5,168,905 A * | 12/1992 | Phallen | 141/1 |
| 5,188,911 A | 2/1993 | Downing et al. | 429/70 |
| 5,196,275 A | 3/1993 | Goldman et al. | 429/27 |
| 5,208,526 A | 5/1993 | Goldman et al. | 320/2 |
| 5,260,144 A | 11/1993 | O'Callaghan | 429/14 |
| 5,312,699 A | 5/1994 | Yanagi et al. | 429/22 |
| 5,316,869 A | 5/1994 | Perry, Jr. et al. | 429/19 |
| 5,318,861 A | 6/1994 | Harats et al. | 429/21 |
| 5,346,778 A | 9/1994 | Ewan et al. | 429/19 |
| 5,348,820 A | 9/1994 | Suga et al. | 429/216 |
| 5,360,680 A | 11/1994 | Goldman et al. | 429/27 |
| 5,366,829 A | 11/1994 | Saidi | 429/216 |
| 5,369,353 A | 11/1994 | Erdman | 323/207 |
| 5,378,329 A | 1/1995 | Goldstein et al. | 204/115 |
| 5,382,482 A | 1/1995 | Suga et al. | 429/206 |
| 5,401,589 A | 3/1995 | Palmer et al. | 429/13 |
| 5,405,713 A | 4/1995 | Pecherer et al. | 429/49 |
| 5,411,815 A | 5/1995 | Goldstein | 429/50 |
| 5,427,872 A | 6/1995 | Shen et al. | 429/142 |
| 5,432,710 A | 7/1995 | Ishimaru et al. | 364/493 |
| 5,434,020 A | 7/1995 | Cooper | 429/210 |
| 5,434,021 A | 7/1995 | Fauteux et al. | 429/213 |
| 5,441,820 A | 8/1995 | Siu et al. | 429/17 |
| 5,462,815 A | 10/1995 | Horiuchi | 429/13 |
| 5,476,293 A | 12/1995 | Yang | 290/4 |
| 5,500,561 A | 3/1996 | Wilhelm | 307/64 |
| 5,547,778 A | 8/1996 | Fauteux et al. | 429/81 |
| 5,558,947 A | 9/1996 | Robison | 429/13 |
| 5,563,802 A | 10/1996 | Plahn et al. | 364/492 |
| 5,569,551 A | 10/1996 | Pedicini et al. | 429/27 |
| 5,578,183 A | 11/1996 | Cooper | 205/64 |
| 5,635,051 A | 6/1997 | Salas-Morales et al. | 205/602 |
| 5,637,414 A | 6/1997 | Inoue et al. | 429/13 |
| 5,780,186 A | 7/1998 | Casey, Jr. | 429/229 |
| 5,783,932 A | 7/1998 | Namba et al. | 322/16 |
| 5,795,666 A | 8/1998 | Johnssen | 429/17 |
| 5,795,679 A | 8/1998 | Kawakami et al. | 429/218 |
| 5,824,434 A | 10/1998 | Kawakami et al. | 429/209 |
| 5,849,427 A | 12/1998 | Siu et al. | 429/19 |
| 5,869,200 A | 2/1999 | Nunnally | 429/10 |
| 5,880,536 A | 3/1999 | Mardirossian | 307/44 |
| 5,885,727 A | 3/1999 | Kawatsu | 429/17 |
| 5,929,538 A | 7/1999 | O'Sullivan et al. | 307/66 |
| 5,952,117 A | 9/1999 | Colborn et al. | 429/27 |
| 5,958,210 A | 9/1999 | Siu et al. | 205/602 |
| 5,961,928 A | 10/1999 | Maston et al. | 422/110 |
| 5,969,435 A | 10/1999 | Wilhelm | 307/64 |
| 5,984,986 A | 11/1999 | Wiesheu et al. | 48/203 |
| 5,985,474 A | 11/1999 | Chen et al. | 429/17 |
| 5,999,888 A | 12/1999 | Aubee | 702/45 |
| 6,051,192 A | 4/2000 | Maston et al. | 422/110 |
| 6,067,482 A | 5/2000 | Shapiro | 700/286 |
| 6,153,329 A | 11/2000 | Raschilla et al. | 429/65 |
| 6,162,555 A | 12/2000 | Gutierrez et al. | 429/15 |
| 6,186,254 B1 | 2/2001 | Mufford et al. | 180/65.3 |
| 6,230,496 B1 | 5/2001 | Hofmann et al. | 60/706 |
| 6,242,873 B1 | 6/2001 | Drozdz et al. | 318/139 |
| 6,296,958 B1 | 10/2001 | Pinto et al. | 429/15 |
| 6,321,145 B1 | 11/2001 | Rajashekara | 701/22 |
| 6,326,763 B1 | 12/2001 | King et al. | 320/101 |
| 6,423,437 B1 * | 7/2002 | Kenyon et al. | 429/39 |
| 6,503,650 B1 * | 1/2003 | Yasuo et al. | 429/26 |

* cited by examiner

MANIFOLD FOR FUEL CELL SYSTEM

RELATED APPLICATIONS

This application is related to U.S. patent application Ser. No. 09/930,557, entitled "POWER SYSTEM INCLUDING HEAT REMOVAL UNIT FOR PROVIDING BACKUP POWER TO ONE OR MORE LOADS," filed Aug. 15, 2001; U.S. patent application Ser. No. 09/930,394, entitled "METAL FUEL CELL SYSTEM FOR PROVIDING BACKUP POWER TO ONE OR MORE LOADS," filed Aug. 15, 2001; U.S. Provisional Application No. To Be Determined, entitled "ULTRA-LONG DURATION BACKUP FOR CRITICAL APPLICATIONS USING ZINC/AIR REGENERATIVE FUEL CELLS," Howrey Dkt. No. 04813.0019.PZUS00, filed Sep. 10, 2001; U.S. Provisional Application No. To Be Determined, entitled "ULTRA-LONG DURATION BACKUP FOR TELECOMMUNICATIONS APPLICATIONS USING ZINC/AIR REGENERATIVE FUEL CELLS," filed Oct. 11, 2001, U.S. patent application Ser. No. To Be Determined, entitled "METHODS OF PRODUCING OXYGEN REDUCTION CATALYST," filed Oct. 9, 2001; U.S. patent application Ser. No. To Be Determined, entitled "RECIRCULATING ANODE," filed on even date herewith; U.S. patent application Ser. No. To Be Determined, entitled "FUEL CELL SYSTEM," filed on even date herewith; U.S. patent application Ser. No. To Be Determined, entitled "METHODS OF USING FUEL CELL SYSTEM CONFIGURED TO PROVIDE POWER TO ONE OR MORE LOADS," filed on even date herewith; and U.S. patent application Ser. No. To Be Determined, entitled "POLYMER COMPOSITES, CATHODES, AND SYSTEMS THEREOF," filed on even date herewith. Each of these applications is hereby fully incorporated by reference herein as though set forth in full.

FIELD OF THE INVENTION

This invention relates generally to fluid flow in a manifold, and more particularly, to the conversion of single channel multiphase fluid flow into multi-channel multiphase flows having uniform flow properties.

RELATED ART

Fluid manifolds have a variety of useful industrial applications, some of the more common being fuel supply and exhaust systems for internal combustion engines. These are typical examples of systems using manifolds to channel single phase fluids, such as liquid fuel or gaseous exhaust. Manifolds are also used for communicating multiphase fluids, which consist of two or more components having different phases, e.g. a mixture of liquid and solid particles. One application for multiphase manifolds is in metal-based fuel cells, where fuel in the form of metal particles is entrained in a flow of electrolyte solution, and delivered via a channel to a cell or combination of cells from which electricity is derived by means of oxidation reduction.

A manifold for dividing a single fluid flow into two flow paths can be defined in simplistic form by a single tubular pipe connected to a T coupling. Provided that there are no variations in pipe diameter or other obstructions, fluid flow directed through the tubular pipe splits into two essentially equal parts at the T intersection. The point of abrupt obstruction where the fluid impacts the wall of the T coupling creates a stagnation point where the fluid velocity is zero. The geometry of the T coupling directs the fluid flow radially outward from stagnation point at right angles from the direction of incident flow.

By using a combination of T couplings, a single input flow can be split in successive stages to create any number of multiple output flows. However, one skilled in the art will readily recognize the geometric complexity that this technique introduces into the system after the second stage. Such complexity is not practical for use in a metal/air fuel cell, which requires a more compact arrangement of parallel flow paths in order to integrate the manifold within a portable stacked cell design. More conventional fluid manifolds, such as those used in fuel supply systems of internal combustion engines, are designed for communication of single phase fluids. The geometries of these manifolds are typically customized to interface with their particular engine systems, and as a result, may include branch lines that assume various asymmetrical or complex shapes. Multiphase fluid flow through such a manifold will typically produce undesirable variations in the fluid concentration and/or flow rate of the dispersed phase of the multiphase fluid. Due to differences in the length, there can be differences in the pressure drops at the individual branches. The differences in pressure drops can cause differences in flow rates (e.g., velocities), and thus can result in differences in the flow rates of the dispersed phase. Further, these differences in flow rates can result in different drag forces, and thus can result in different concentrations of the dispersed phase.

Thus, there is presently a need for an improved manifold that can provide uniform flow properties for multiphase fluid flow through a plurality of parallel outlet channels. Moreover, the manifold should be sufficiently compact in design to facilitate integration within a stacked fuel cell.

SUMMARY

In one aspect, the present invention is directed to a novel method for converting a single channel fluid flow into multiple channels of fluid flow having substantially uniform flow properties. The invention is particularly directed for use in multiphase fluid systems that require preservation of dispersed phase concentration and or flow rate.

In one aspect, the invention pertains to methods of converting a single flow of a multiphase fluid into a plurality of separate channeled flows each having substantially the same pressure at the inlet of its channel. Typically, such methods comprise impacting the single flow against a surface to form a stagnation point and a plurality of intermediate flows radiating outward from the stagnation point, and directing at least a portion of this plurality of intermediate flows across a predetermined distance from the stagnation point to form the first plurality of separate channeled flows. Generally, this predetermined distance is selected from a range of distances that produce substantially identical pressures at each of the channel inlets.

In another aspect, the invention pertains to methods of forming a plurality of separate flows of a multiphase fluid each having substantially the same flow rate. Typically, such methods comprise impacting a single flow of the multiphase fluid against a surface so as to form a stagnation point and the plurality of separate flows radiating outward from the stagnation point. Consistent with this impact, the separate flows generally each have substantially the same flow rate.

In a further aspect, the invention pertains to methods of forming a plurality of separate channeled flows of a multiphase fluid from a plurality of intermediate flows, each separate channeled flow having substantially the same pressure at the inlet of its channel. Typically, such methods comprise directing at least a portion of the plurality of intermediate flows across a predetermined distance from a stagnation point to a plurality of channels to form the first plurality of separate channeled flows. Generally, this predetermined distance is selected from the range of distances that produce substantially identical pressures at each of the channel inlets.

In an additional aspect, the invention pertains to apparatus comprising a means for converting a single flow of a multiphase fluid into a plurality of separate channeled flows of the multiphase fluid. Typically, such apparatus comprise means for converting the single flow into the plurality of separate channeled flows such that one or more of the following conditions are met: (i) each of the separate channeled flows has substantially the same pressure at the inlet of its channel, (ii) each of the separate channeled flows is formed from at least a portion of a plurality of intermediate flows directed in a direction substantially perpendicular to the direction of the single flow, and (iii) each of the separate channeled flows is formed from at least a portion of the plurality of intermediate flows formed by impacting the single flow onto a surface of the apparatus to form a stagnation point.

All of the aspects presented above may be suitable for many applications, including without limitation incorporation in a manifold for operation in a fuel cell subsystem and/or a fuel cell and/or an internal combustion engine.

In another aspect, the invention pertains to novel manifolds. In one embodiment, such manifolds comprise an enclosure comprising a surface, a multiphase fluid inlet, and a plurality of multiphase fluid outlets. Generally, the surface of the manifold is characterized in that it is capable of impacting a single flow of the multiphase fluid directed from the multiphase fluid inlet to the surface in a flow direction substantially perpendicular to the surface, wherein said impacting forms a stagnation point from which radiate outward a plurality of flows of multiphase fluid, and directing at least a portion of the resulting plurality of flows to the plurality of multiphase fluid outlets. Usually, the manifold is further characterized in that the average distance between the stagnation point and the plurality of multiphase fluid outlets is a predetermined distance selected from the range of distances that provide that each of the plurality of flows has substantially the same pressure at the beginning of its associated multiphase fluid outlet.

In another embodiment, such manifolds comprise apparatus comprising a means for converting a single flow of a multiphase fluid into a plurality of separate channeled flows of the multiphase fluid, in accordance with the invention.

In a further aspect, the invention pertains to novel fuel cell subsystems. Typically, these fuel cell subsystems comprise at least one manifold in accordance with the invention. These fuel cell subsystems can be suitable for many applications, including without limitation use in a fuel cell and/or use to test operability of various fuel cell components.

In an additional aspect, the invention pertains to novel fuel cells. Typically, these fuel cells comprise at least one manifold in accordance with the invention. These fuel cells can be suitable for many applications, including without limitation use in supplying power to load(s).

In another aspect, the invention pertains to novel internal combustion engines. Typically, these internal combustion engines comprise at least one manifold in accordance with the invention.

In a further aspect, the invention pertains to use of invention methods in suitable systems. Exemplary suitable systems include without limitation fuel cell subsystems, fuel cells, internal combustion engines, and the like, and suitable combinations of any two or more thereof. In any such system, the invention assists in the uniform delivery of each of the components of a single flow of a single or multiphase fluid to a plurality of destinations to which uniform delivery of at least one of the components is desired.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2b is a side view of the embodiment of FIG. 2a.

DETAILED DESCRIPTION

Figure 1:
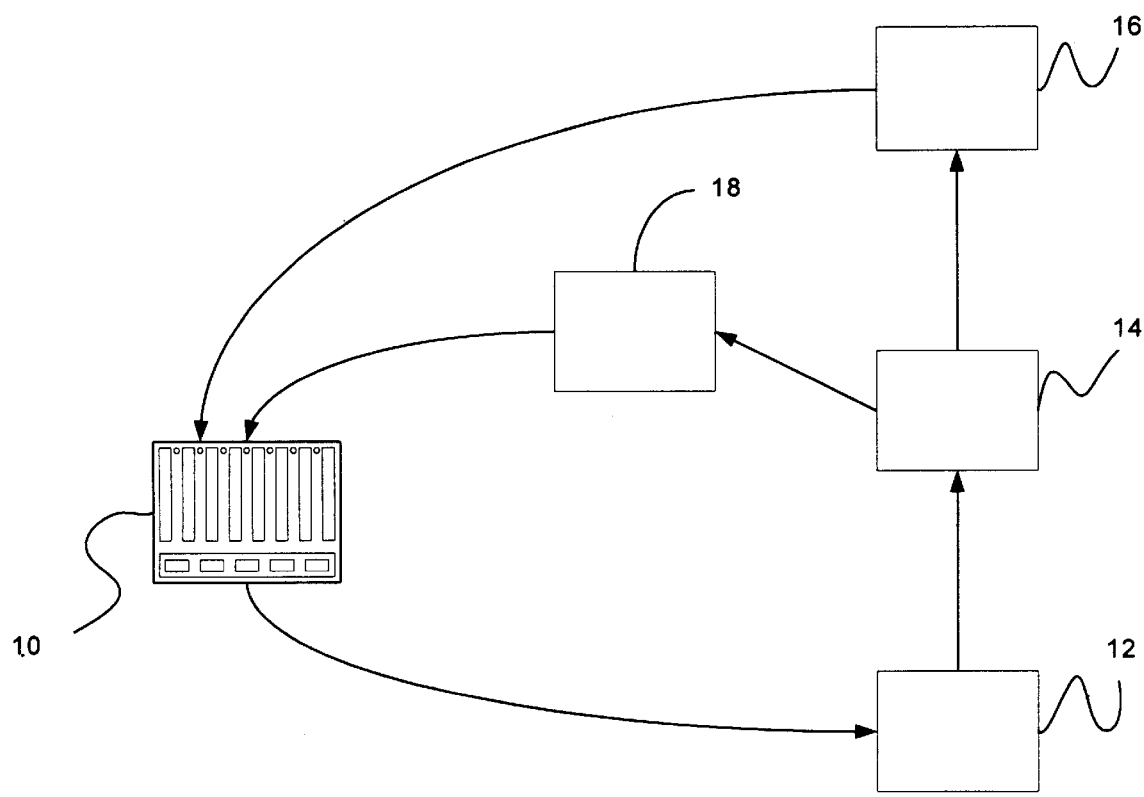
FIG. 1 is a block diagram of a metal fuel cell.

In one aspect, the invention pertains to novel methods of converting a single flow of a multiphase fluid into a plurality of separate channeled flows each having substantially the same pressure at the inlet of its channel.

As utilized herein, the term "flow" includes without limitation laminar or non-laminar motion or circulation with unbroken continuity, and/or the related direction of such motion or circulation, as applicable.

As employed herein, the term "fluid" includes without limitation any substance that is capable of flowing, such as without limitation gases, liquids (e.g., fine or micro droplet (s), vaporized liquid, and the like), and certain solid forms (e.g., microparticles, and the like), and suitable combinations thereof, as well as mixed phase substances, with exemplary fluids including without limitation aqueous substances (e.g., any water-based or solvated fluid) and organic substances (i.e., any non-water based or solvated fluid).

As utilized here, the term "multiphase fluid" includes without limitation any fluid comprising two or more components having different phases. These different phases can occur within the same class of component (e.g., liquid component with two phases, one aqueous (e.g., water) and one organic (e.g., oil), and the like), or across different classes of components (e.g., solid particles in a liquid or gas, gaseous bubbles in a liquid or solid particle stream, liquid droplets in a gas or solid particle stream, and the like, and suitable combinations thereof). Suitable multiphase fluids contemplated for use in accordance with the invention include without limitation two or more different phases within a liquid, solid or gaseous component fluid, solid component/liquid component fluids (e.g., metal (e.g., zinc) particles in a carrier solution (e.g., KOH solution), and the like), solid component/gas component fluids, liquid component/gas component fluids (e.g., gaseous bubbles in a liquid carrier (e.g., hydrogen gas in a hydrocarbon (e.g., oil) liquid), liquid droplets in a gaseous carrier (e.g., refined gasoline liquid droplets in an oxygen-rich (e.g., air) gas), and the like, and suitable combinations thereof), and the like, and suitable combinations of any two or more thereof.

As employed herein, the term "separate channeled flow" includes without limitation any flow whose movement off the axis of flow direction and/or whose contact with other flows is constrained by the motion of the flow and/or by a suitable barrier. Suitable barriers include without limitation channels, tunnels, hoses, walled supports, troughs, any enclosure that can operate to both contain the fluid flow and to constrain its movement off the axis of fluid flow (i.e., either directly (e.g., via some barrier, wall, other surface, or the like, or suitable combinations thereof) or indirectly (e.g., via use of a suitable constraining force (e.g., gravity, centripetal force, or the like, or suitable combinations thereof), and the like, and suitable combinations thereof.

Typically, the channel of each separate channeled flow is defined by the shape and/or dimensions of the suitable barrier, and each such channel has both an inlet (i.e., the structure or opening through which the fluid flows into the channel) and an outlet (i.e., the structure or opening through which the fluid flows out of the channel). In one embodiment, the channels can be aligned with the radial direction of the plurality of flows emanating from the stagnation point, as described below.

As utilized herein, the term "substantially the same" comprises any deviation upward or downward, if any, from the value modified by between about 0% and about 20% of such value.

Invention methods of converting a single flow of a multiphase fluid into a plurality of separate channeled flows typically comprise impacting the single flow against a surface so as to form a stagnation point and a plurality of intermediate flows radiating outward and substantially symmetrically from the stagnation point, and directing at least a portion of this plurality of intermediate flows across a predetermined distance from the stagnation point to a plurality of channels to form the plurality of separate channeled flows.

As employed herein, the term "substantially symmetrical" denotes a degree of distribution of a deflected flow resulting from the flow impacting a surface at a generally perpendicular angle.

As employed herein, the term "generally perpendicular" means an angle of incidence between the direction of fluid flow and the impacted surface, or between the direction of two different fluid flows, in the range(s) from about 80 to about 90 degrees.

As employed herein, the term "impacting" includes without limitation directing the flow to a surface at the velocity of the flow and at a predetermined angle of impact to the surface. Typically, flow superficial velocities vary in the range(s) from about 0.1 m/s to about 10 m/s though flow superficial velocities can be larger than this. Typical superficial velocities are calculated by taking the flow rate of the fluid divided by the cross sectional area of the flow channel, assuming that the entire cross sectional area is available to conduct the fluid, i.e. the flow channel is unobstructed.

Suitable surfaces include without limitation flat planes, cones, prisms, and other shapes that define a planar symmetry that is axial to the single flow that impacts the surface at a stagnation point. Generally, the material comprising the surface is sufficiently stiff to not substantially distort the surface under the impact of the single flow at the stagnation point.

As employed herein, "stagnation point" includes without limitation that point at/on the surface on which the primary flow is impacted at which the velocity of the multiphase fluid is mathematically zero (as determined by solving suitable flow equations and optionally assuming a single phase fluid).

As utilized herein, "radiating outward" includes without limitation those lines of motion that move about radially and about linearly outward from the stagnation point, and associated motion along those lines of motion.

As employed herein, "directing" includes without limitation changing the direction of motion of the flow of a fluid. Exemplary such directing can occur either directly (e.g., via impact on a surface, or the like) or indirectly (e.g., via change in a pressure field of the associated fluid, or the like). Suitable structures that can be utilized to direct at least a portion of the plurality of flows generated on impacting the primary flow at the stagnation point include without limitation all shapes that circumscribe the stagnation point and the two outermost channels of the separate channeled flows, and that connect the general area of the stagnation point with each of the two outermost channels of the separate channeled flows in a substantially linear fashion.

Suitable predetermined distances can generally be in the range(s) of distances that provide that each of the separate channeled flows has substantially the same pressure at the inlet of its channel, or alternatively, that each of the separate channeled flows has equivalent composition (e.g. dispersed phase concentration) and/or flow rate. Generally, these predetermined distances can be selected to be not so large that the streamlines of the plurality of flows do not substantially distort, and to be not so small that the outer channels of the plurality of channels do not receive substantially straight streamlines of the outer channel-directed plurality of flows. Suitable tools exist to permit those of skill in the art to calculate a rough approximation of suitable ranges for these predetermined distances, based on the constraints set forth above. In one, non-limiting example, a theoretical range of predetermined distances can be calculated by assuming that the single flow of multiphase fluid is actually a single phase, and then inputting geometric variables (e.g. the number of channels required, channel width, and channel baffles width) and flow variables (e.g., viscosity of single phase, density of single phase, superficial velocity of the fluid downstream of the stagnation point, and direction of the channels downstream) into an appropriate computational modeling tool (e.g., Fluent software, Fluent, Inc., Lebanon, N.H.). An exemplary determination of this predetermined distance is set forth in Example 1.

In an additional aspect, the invention pertains to fuel cell subsystems. As utilized herein, "fuel cell subsystems" include without limitation systems comprising manifold(s) in an amount in the range(s) from about 1 to about 100, each independently prepared in accordance with the invention, and one or more other components of a fuel cell. These components include without limitation cathode(s) (e.g., the cathode found in the application referenced above), anode(s) (e.g., the recirculating anode found in the application referenced above), separator(s), electrolyte, pellet delivery/feeding, cell stack, cell frame, cooling mechanism, air management mechanism, optional fuel regenerator, electronics/control system, and the like, and suitable combinations of any two or more thereof. Although these fuel cell subsystems can comprise manifold(s) according to the invention, the specific number and/or types of manifold(s) can be varied depending on the intended use or application of the fuel cell subsystem. Thus, for use in fuel cells and use to test operability of various fuel cell components, these fuel cell subsystems can vary as discussed above, and, in one non-limiting example, can comprise at least one manifold comprising an inlet for a single flow of a multiphase fluid to an enclosure having at least one inner surface substantially perpendicular to the incident inlet flow, and a triangular nozzle for directing, between two channel walls, the intermediate flow that expands radially outward from the stagnation point to the inlets of nine separate rectangular channels.

A block diagram of a fuel cell is illustrated in FIG. 1. As illustrated, the fuel cell comprises a power source 10, an optional reaction product storage unit 12, an optional regeneration unit 14, a fuel storage unit 16, and an optional second reactant storage unit 18. The power source 10 in turn comprises one or more cells each having a cell body defining a cell cavity, with an anode and cathode situated in each cell cavity. The cells can be coupled in parallel or series. In one implementation, they are coupled in series to form a cell stack.

The anodes within the cell cavities in power source 10 comprise the fuel stored in fuel storage unit 16. Within the cell cavities of power source 10, an electrochemical reaction takes place whereby the anode releases electrons, and forms one or more reaction products. Through this process, the anodes are gradually consumed.

The released electrons flow through a load to the cathode, where they react with one or more second reactants from an optional second reactant storage unit 18 or from some other source. This flow of electrons through the load gives rise to an overpotential (i.e., work) required to drive the demanded current, which overpotential acts to decrease the theoretical voltage between the anode and the cathode. This theoretical voltage arises due to the difference in electrochemical potential between the anode (Zn potential of −1.215V versus standard hydrogen electrode (SHE) reference at open circuit) and cathode ($O_2$ potential of +0.401V versus SHE reference at open circuit). When the cells are combined in series, the sum of the voltages for the cells forms the output of the power source.

The one or more reaction products can then be provided to optional reaction product storage unit 12 or to some other destination. The one or more reaction products, from unit 12 or some other source, can then be provided to optional regeneration unit 14, which regenerates fuel and/or one or more of the second reactants from the one or more reaction products. The regenerated fuel can then be provided to fuel storage unit 16, and/or the regenerated one or more second reactants can then be provided to optional second reactant storage unit 18 or to some other destination. As an alternative to regenerating the fuel from the reaction product using the optional regeneration unit 14, the fuel can be inserted into the system from an external source and the reaction product can be withdrawn from the system.

The optional reaction product storage unit 12 comprises a unit that can store the reaction product. Exemplary reaction product storage units include without limitation one or more tanks, one or more sponges, one or more containers, one or more vats, one or more barrels, one or more vessels, and the like, and suitable combinations of any two or more thereof. Optionally, the optional reaction product storage unit 12 is detachably attached to the system.

The optional regeneration unit 14 comprises a unit that can electrolyze the reaction product(s) back into fuel (e.g., hydrogen, metal particles and/or metal-coated particles, and the like) and/or second reactant (e.g., air, oxygen, hydrogen peroxide, other oxidizing agents, and the like, and suitable combinations of any two or more thereof). Exemplary regeneration units include without limitation water electrolyzers (which regenerate an exemplary second reactant (oxygen) and/or fuel (hydrogen) by electrolyzing water), metal (e.g., zinc) electrolyzers (which regenerate a fuel (e.g., zinc) and a second reactant (e.g., oxygen) by electrolyzing a reaction product (e.g., zinc oxide (ZnO)), and the like. Exemplary metal electrolyzers include without limitation fluidized bed electrolyzers, spouted bed electrolyzers, and the like, and suitable combinations of two or more thereof. The power source 10 can optionally function as the optional regeneration unit 14 by operating in reverse, thereby foregoing the need for a regeneration unit 14 separate from the power source 10. Optionally, the optional regeneration unit 14 is detachably attached to the system.

The fuel storage unit 16 comprises a unit that can store the fuel (e.g., for metal fuel cells, metal (or metal-coated) particles or liquid born metal (or metal-coated) particles or suitable combinations thereof; for hydrogen fuel cells, hydrogen or hydrogen containing compounds that can be reformed into a usable fuel prior to consumption). Exemplary fuel storage units include without limitation one or more tanks (for example, without limitation, a high-pressure tank for gaseous fuel (e.g., hydrogen gas), a cryogenic tank for liquid fuel which is a gas at operating temperature (e.g., room temperature) (e.g., liquid hydrogen), a metal-hydride-filled tank for holding hydrogen, a carbon-nanotube-filled tank for storing hydrogen, a plastic tank for holding potassium hydroxide (KOH) and metal (e.g., zinc (Zn), other metals, and the like) particles, and the like), one or more sponges, one or more containers (e.g., a plastic container for holding dry metal (e.g., zinc (Zn), other metals, and the like) particles, and the like), one or more vats, one or more barrels, one or more vessels, and the like, and suitable combinations of any two or more thereof. Optionally, the fuel storage unit 16 is detachably attached to the system.

The optional second reactant storage unit 18 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more sponges, one or more containers, one or more vats, one or more barrels, one or more vessels, and the like, and suitable combinations of any two or more thereof. Optionally, the optional second reactant storage unit 18 is detachably attached to the system.

In one embodiment, the fuel cell is a metal fuel cell. The fuel of a metal fuel cell is a metal that can be in a form to facilitate entry into the cell cavities of the power source 10. For example, the fuel can be in the form of metal (or metal-coated) particles or liquid born metal (or metal-coated) particles or suitable combinations thereof. Exemplary metals for the metal (or metal-coated) particles include without limitation zinc, aluminum, lithium, magnesium, iron, and the like.

In this embodiment, when the fuel is optionally already present in the anode of the cell cavities in power source 10 prior to activating the fuel cell, the fuel cell is pre-charged, and can start-up significantly faster than when there is no fuel in the cell cavities and/or can run for a time in the range(s) from about 0.001 minutes to about 100 minutes without additional fuel being moved into the cell cavities. The amount of time which the fuel cell can run on a pre-charge of fuel within the cell cavities can vary with, among other factors, the pressurization of the fuel within the cell cavities, and alternative embodiments of this aspect of the invention permit such amount of time to be in the range(s) from about 1 second to about 100 minutes or more, and in the range(s) from about 30 seconds to about 100 minutes or more.

Moreover, the second reactant optionally can be present in the fuel cell and pre-pressurized to any pressure in the range(s) from about 0.01 psi gauge pressure to about 200 psi gauge pressure prior to a an outage sense time after the controller sensing the power outage condition to facilitate the fuel cell's start-up in a timeframe significantly faster than when there is no second reactant present and no pre-pressurization in the fuel cell prior to the optional controller sensing the power outage condition. Optionally, the one or more second reactants are present in the power source 20 at a time prior to an outage sense time, which outage sense time is in the range(s) from about 10 microseconds to about 10 seconds after the controller has sensed outage of primary power to the one or more loads system. Optionally, this time is also after the controller has sensed outage of primary power to the one or more loads.

Moreover, in this embodiment, one optional aspect provides that the volumes of one or both of the fuel storage unit 16 and the optional second reactant storage unit 18 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about 0.001 liters to about 1,000,000 liters.

In one aspect of this embodiment, at least one of, and optionally all of, the metal fuel cell(s) is a zinc fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products can be the zincate ion, $Zn(OH)_4^{2-}$, or zinc oxide, $ZnO$.

In this embodiment, the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 18 can be excluded), or from the second reactant storage unit 18. Similarly, when the second reactant is oxygen in water, the water can be provided from the second reactant storage unit 18, or from some other source, e.g., tap water (in which case the optional second reactant storage unit 18 can be excluded). In order to replenish the cathode, to deliver second reactant(s) to the cathodic area, and to facilitate ion exchange between the anodes and cathodes, a flow of the second reactant(s) can be maintained through a portion of the cells. This flow optionally can be maintained through one or more pumps (not shown in FIG. 1), blowers or the like, or through some other means.

In this embodiment, the particulate anodes are gradually consumed through electrochemical dissolution. In order to replenish the anodes, to deliver KOH to the anodes, and to facilitate ion exchange between the anodes and cathodes, a recirculating flow of the fuel borne zinc particles can be maintained through the cell cavities. This flow can be maintained through one or more pumps (not shown) or through some other means. As the potassium hydroxide contacts the zinc anodes, the following reaction takes place at the anodes:

$$Zn + 4OH^- \rightarrow Zn(OH)_4^{2-} + 2e^- \qquad (1)$$

The two released electrons flow through a load to the cathode where the following reaction takes place:

$$\frac{1}{2}O_2 + 2e^- + H_2O \rightarrow 2OH^- \qquad (2)$$

The reaction product is the zincate ion, $Zn(OH)_4^{2-}$, which is soluble in the reaction solution KOH. The overall reaction which occurs in the cell cavities is the combination of the two reactions (1) and (2). This combined reaction can be expressed as follows:

$$Zn + 2OH^- + \frac{1}{2}O_2 + H_2O \rightarrow Zn(OH)_4^{2-} \qquad (3)$$

Alternatively, the zincate ion, $Zn(OH)_4^{2-}$, can be allowed to precipitate to zinc oxide, ZnO, a second reaction product, in accordance with the following reaction:

$$Zn(OH)_4^{2-} \rightarrow ZnO + H_2O + 2OH^- \qquad (4)$$

In this case, the overall reaction which occurs in the cell cavities is the combination of the three reactions (1), (2), and (4). This overall reaction can be expressed as follows:

$$Zn + \frac{1}{2}O_2 \rightarrow ZnO \qquad (5)$$

Under real world conditions, the reactions (4) or (5) yield an open-circuit voltage potential of about 1.4V. For additional information on this embodiment of a zinc/air battery, the reader is referred to U.S. Pat. Nos. 5,952,117; 6,153,329; and 6,162,555, which are hereby incorporated by reference herein as though set forth in full.

The reaction product $Zn(OH)_4^{2-}$, and also possibly ZnO, can be provided to reaction product storage unit 12. Optional regeneration unit 14 can then reprocess these reaction products to yield oxygen, which can be released to the ambient air or stored in second reactant storage unit 18, and zinc particles, which are provided to fuel storage unit 16. In addition, the optional regeneration unit 14 can yield water, which can be discharged through a drain or stored in second reactant storage unit 18. It can also regenerate hydroxide, $OH^-$, which can be discharged or combined with potassium to yield the potassium hydroxide reaction solution.

The regeneration of the zincate ion, $Zn(OH)_4^{2-}$, into zinc, and one or more second reactants can occur according to the following overall reaction:

$$Zn(OH)_4^{2-} \rightarrow Zn + 2OH^- + H_2O + \frac{1}{2}O_2 \qquad (6)$$

The regeneration of zinc oxide, ZnO, into zinc, and one or more second reactants can occur according to the following overall reaction:

$$ZnO \rightarrow Zn + \frac{1}{2}O_2. \qquad (7)$$

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, and the like are possible, as are metal fuel cells where the fuel is not in particulate form but in another form such as sheets or ribbons or strings or slabs or plates. Embodiments are also possible in which the fuel is not fluid borne or continuously recirculated through the cell cavities (e.g., porous plates of fuel, ribbons of fuel being cycled past a reaction zone, and the like). It is also possible to avoid an electrolytic reaction solution altogether or at least employ reaction solutions besides potassium hydroxide, for example, without limitation, sodium hydroxide, inorganic alkalis, alkali or alkaline earth metal hydroxides. See, for example, U.S. Pat. No. 5,958,210, the entire contents of which are incorporated herein by this reference. It is also possible to employ metal fuel cells that output AC power rather than DC power using an inverter, a voltage converter, and the like.

In a second embodiment of a fuel cell, the fuel used in the electrochemical reaction that occurs within the cells is hydrogen (e.g., derived from hydrogen for alkali-based fuel cell, and methanol/ethanol for acid-based fuel cell), the second reactant is oxygen, and the reaction product is water. In one aspect, the hydrogen fuel is maintained in the fuel storage unit 16, but the second reactant storage unit 18 can be omitted and the oxygen used in the electrochemical reaction within the cells can be taken from the ambient air. In another aspect, the hydrogen fuel is maintained in the fuel storage unit 16, and the oxygen is maintained in the second reactant storage unit 18. In addition, the optional reaction product storage unit 12 can be included or omitted, and the water resulting from discharge of the unit simply discarded or stored in the reaction product storage unit 12 (if present), respectively. Later, the optional regeneration unit 14 can regenerate water from another source, such as tap water, or from the reaction product storage unit 12 (if present) into hydrogen and oxygen. The hydrogen can then be stored in fuel storage unit 12, and the oxygen simply released into the ambient air or maintained in the second reactant storage unit 18.

In a third embodiment of a fuel cell, a metal fuel cell system is provided that has one, or any suitable combination of two or more, of the following properties: the system optionally can be configured to not utilize or produce significant quantities of flammable fuel or product, respectively; the system can provide backup power to the one or more loads for an amount of time limited only by the amount of fuel present (e.g., in the range(s) from about 0.01 hours to about 10,000 hours or more, and in the range(s) from about 0.5 hours to about 650 hours, or more); the system optionally can be configured to have an energy density in the range(s) from about 35 Watt-hours per kilogram of combined fuel and electrolyte added to about 400 Watt-hours per kilogram of combined fuel and electrolyte added; the system optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of the one or more load(s) comprising the system (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours); the system optionally can be configured to have a fuel storage unit that can store fuel at an internal pressure in the range(s) from about −5 pounds per square inch (psi) gauge pressure to about 200 psi gauge pressure.

An advantage of fuel cells relative to traditional power sources such as lead acid batteries is that they can provide longer term backup power more efficiently and compactly. This advantage stems from the ability to continuously refuel the fuel cells using fuel stored with the fuel cell, from some other source, and/or regenerated from reaction products by the optional regeneration unit 14. In the case of the zinc fuel cell, for example, the duration of time over which energy can be provided is limited only by the amount of fuel which is initially provided in the fuel storage unit, which is fed into the system during replacement of a fuel storage unit 16, and/or which can be regenerated from the reaction products that are produced. Thus, the system, comprising at least one fuel cell that comprises an optional regeneration unit 14 and/or a replaceable fuel storage unit 16, can provide backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more. Moreover, a system can optionally be configured to expel substantially no reaction product(s) outside of the system (e.g., into the environment).

Although fuel cells in accordance with the invention comprise manifold(s) according to the invention, the specific number and/or types of manifold(s) can be varied depending on the intended use or application of the fuel cell. Fuel cells may be customized according to the desired load being serviced. For example, such loads include, without limitation, lawn & garden equipment; radios; telephone; targeting equipment; battery rechargers; laptops; communications devices; sensors; night vision equipment; camping equipment (including without limitation, stoves, lanterns, lights, and the like); lights; vehicles (including without limitation, cars, recreational vehicles, trucks, boats, ferries, motorcycles, motorized scooters, forklifts, golf carts, lawnmowers, industrial carts, passenger carts (airport), luggage handling equipment (airports), airplanes, lighter than air crafts (e.g., blimps, dirigibles, and the like), hovercrafts, trains (e.g., locomotives, and the like), and submarines (manned and unmanned); torpedoes; security systems; electrical energy storage devices for renewable energy sources (e.g., solar-based, tidal-based, hydro-based, wind-based, and the like); many other types of electrical devices, equipment for which a primary and/or backup power source is necessary or desirable to enable the equipment to function for its intended purpose, military-usable variants of above, and the like; and suitable combinations of any two or more thereof. The fuel cells can vary as discussed above, and, in one non-limiting example, can comprise at least one manifold comprising as many as nine separate outlet channels.

As utilized herein, the term "about" comprises any deviation upward or downward from the value modified by "about" by between 0.01% and 20% of such value.

As employed herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

EXAMPLE 1

Making of a Manifold

Figure 2A:
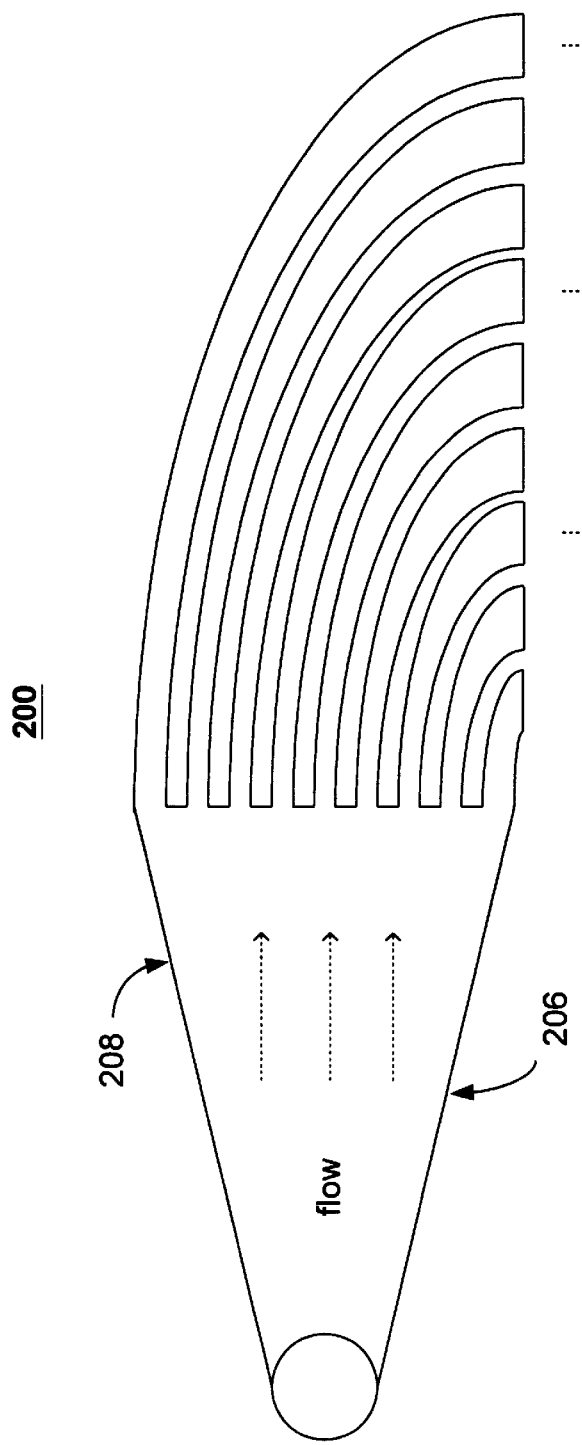
FIG. 2a is a top view of a preferred embodiment of a manifold according to the invention comprising a triangular shaped nozzle.
Figure 2B:
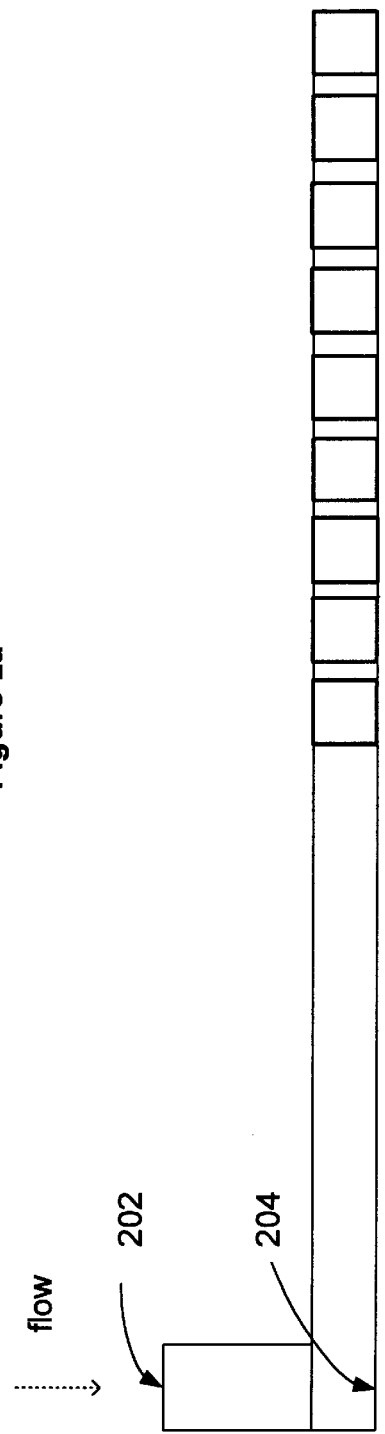

A manifold can be constructed in accordance with the invention as follows. With reference to FIG. 2, a manifold 200 can be constructed to comprise an inlet 202 for a single flow of a multiphase fluid (e.g., Zinc solid particles in a KOH liquid solution). The manifold is constructed so that the single flow impacts the base surface 204 of the inlet 202 at a 90 degree angle to the flow at a point on the base surface (e.g., the stagnation point), and can thus generate a plurality of redirected flows moving radially outward from the stagnation point and perpendicular to the original single flow. Two walls of the manifold, 206 and 208, capture only a portion of the plurality of redirected flows and further guide this portion across a predetermined distance from the stagnation point to the inlets of nine separate channels. In the case of a manifold having 9 channels comprising a 3 mm×10 mm rectangular cross section, this predetermined distance can be about one inch. Each of the separate channeled flows can be then directed downstream from the associated channel inlet and out of the manifold.

While various embodiments of the invention have been described, it will be apparent to those of ordinary skill in the art that many more embodiments and implementations are possible that are within the scope of this invention.

What is claimed is:

1. A method of converting a single flow of a multiphase fluid into a plurality of separate channeled flows having substantially identical inlet pressures, comprising:
    impacting the single flow against a surface generally perpendicular to the flow to form a stagnation point where said flow impacts said surface, whereby the flow is deflected along the surface, said deflected flow radiating substantially symmetrically outward from the stagnation point; and
    directing at least a portion of the deflected flow through at least one intermediate channel generally perpendicular to the single flow along a predetermined distance from the stagnation point to a plurality of channels to form the plurality of separate channeled flows, wherein the predetermined distance is selected to provide substantially identical inlet pressures for each of the channels.

2. The method of claim 1 further comprising varying the length of the channels while maintaining equivalent cross-sectional areas of said channels to provide substantially identical flow rates through the channels.

3. The method of claim 2 further comprising maintaining the maximum flow rate variation between any two of the channels at two per cent.

4. The method of claim 2 further comprising maintaining the maximum inlet pressure variation between any two of the channels at two per cent.

5. The method of claim 2 further comprising maintaining an angle of incidence between the single flow and the surface from 80 to 90 degrees.

6. The method of claim 2 wherein the multiphase fluid comprises an electrolyte solution comprising metal particles.

7. The method of claim 6 wherein the solution comprises potassium hydroxide and the metal comprises zinc.

8. Use of the method of claim 1, or 2, in a fuel cell subsystem.

9. Use of the method of claim 1, or 2, in a fuel cell.

10. Use of the method of claim 1, or 2, in an internal combustion engine.

11. A method of converting a single flow of a multiphase fluid having a concentration into a plurality of separate channeled flows having substantially identical inlet pressures and substantially identical concentrations, comprising:
    impacting the single flow against a surface at an angle of incidence between the single flow and the surface of between 80 and 90 degrees to form a stagnation point where said flow impacts said surface, whereby the flow is deflected along the surface, said deflected flow radiating substantially symmetrically outward from the stagnation point; and
    directing at least a portion of the deflected flow through at least one intermediate channel generally perpendicular to the single flow along a predetermined distance from the stagnation point to a plurality of channels to form the plurality of separate channeled flows, wherein the predetermined distance is selected to maintain a maximum inlet pressure variation between any two of the channels at two per cent and the concentration of the fluid in each of the channels is substantially identical.

12. An apparatus comprising means for converting a single flow of a multiphase fluid into a plurality of separate channeled flows of the multiphase fluid such that at least one of the following conditions applies:
    (i) each of the separate channeled flows has substantially the same pressure at the inlet of its channel;
    (ii) each of the separate channeled flows is formed from at least a portion of a flow deflected in a direction substantially perpendicular to the incident direction of the single flow;
    (iii) each of the separate channeled flows is formed from at least a portion of a plurality of flows formed by impacting the single flow onto a surface of the apparatus to form a stagnation point.

13. The apparatus of claim 12 wherein at least two of the recited conditions apply.

14. A manifold comprising the apparatus of claim 13.

15. The apparatus of claim 12 wherein all three of the recited conditions apply.

16. A manifold comprising the apparatus of claim 15.

17. A manifold comprising the apparatus of claim 12.

18. A manifold for converting a single flow of a multiphase fluid into a plurality of separate channeled flows, comprising:
    an enclosure having an inner surface;
    a plurality of fluid outlets connected to the enclosure; and
    a fluid inlet for directing the flow inside the enclosure, such that the flow impacts a portion of the inner surface in a direction substantially perpendicular to the surface, whereby a stagnation point forms at the impacted surface from which radiate outward along the surface a plurality of intermediate flows, at least one of said intermediate flows directed to the fluid outlets to form the separate channeled flows, wherein the average distance between the stagnation point and the fluid outlets is predetermined such that the separate channeled flows have substantially equal composition and velocity.

19. A fuel cell subsystem comprising at least one manifold according to claim 18, 17, 14, or 16.

20. A fuel cell comprising at least one manifold according to claim 18, 17, 14, or 16.

21. An internal combustion engine comprising at least one manifold according to claim 18, 17, 14, or 16.

22. The manifold of claim 18 wherein the enclosure includes a channel for directing the at least one intermediate flow.

23. The manifold of claim 22 wherein the channel is a triangular shaped nozzle directing the at least one intermediate flow substantially perpendicular to the direction of inlet flow.

24. The manifold of claim 23 wherein the fluid outlets form rectangular conduits, said conduits extending away from the base of the nozzle in substantially the same direction as the direction of the at least one intermediate flow.

25. The manifold of claim 24 wherein the conduits form a plurality of concentric 90 degree elbows.

* * * * *